(12) United States Patent
Saito

(10) Patent No.: US 6,427,288 B1
(45) Date of Patent: Aug. 6, 2002

(54) TILTING HINGE

(75) Inventor: Kazuo Saito, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 0 days.

(21) Appl. No.: 09/609,988

(22) Filed: Jul. 5, 2000

(30) Foreign Application Priority Data

Jul. 9, 1999 (JP) .......................................... 11-196763

(51) Int. Cl.7 ............................. E05D 15/06; E05D 3/10
(52) U.S. Cl. ............................. 16/361; 16/335; 16/337; 16/340; 16/367
(58) Field of Search .......................... 16/367, 371, 361, 16/363, 360, 337, 338, 340, 335; 248/917, 919, 920, 921; 361/680, 681, 682; 348/837; 353/13

(56) References Cited

U.S. PATENT DOCUMENTS

| | | | | |
|---|---|---|---|---|
| 4,718,127 A | * | 1/1988 | Rittmann et al. | 16/334 |
| 5,335,142 A | * | 8/1994 | Anderson | 361/681 |
| 6,038,739 A | * | 3/2000 | Katoh | 16/342 |
| 6,189,842 B1 | * | 2/2001 | Bergeron Gull et al. | 248/919 |
| 6,256,837 B1 | * | 7/2001 | Lan et al. | 16/334 |

\* cited by examiner

Primary Examiner—Chuck Y. Mah
(74) Attorney, Agent, or Firm—Notaro & Michalos P.C.

(57) ABSTRACT

To prevent the force of operation required for tilting up and down a display unit from varying from one to another tilted angle of the display unit, to rotate the display unit with a detent, for use with no degradation of performance even after a long-term use, and to permit a horizontal oscillation of the display unit, there is provided a tilting hinge including a fixing member having side plates and installed to a stand for the display unit, the fixing member serving also as a spring case, a support member for the display unit, installed to the side plates of the fixing member with a hinge pin to be tiltable up and down, a friction mechanism including the hinge pin and provided between the fixing and support members, an actuator provided on the support member rotatably about the hinge pin, and a compression spring provided between the actuator and fixing member with a slider in contact with the actuator, being provided between the actuator and compression spring. The friction mechanism includes means for frictionally pivoting the support member vertically in relation to the fixing member, provided with the hinge pin being installed to the fixing member and the support member being installed to the hinge pin to be tiltable up and down, a first friction washer is provided between one side of the support member and a large-diameter portion of the hinge pin with the hinge pin being inserted through the center of the first friction washer, a second friction washer provided on the other side of the support member with the hinge pin being inserted through the center of the second friction washer, and a spring washer and pressing washer, provided adjacent to the second friction washer with the hinge pin being inserted through the centers of the spring and pressing washers, the pressing washer on the hinge pin being calked.

5 Claims, 14 Drawing Sheets

TILTING HINGE

BACKGROUND OF THE INVENTION

1. Field of the Invention

The present invention relates to a hinge, and more particularly to a tilting hinge suitably us able for supporting a personal computer monitor, television display unit and the like, which are of a stationary type.

2. Description of the Prior Art

Recently, the liquid crystal display (LCD) has been used widely as a personal computer monitor, television display unit and the like. The display unit is thinner than the conventional cathode ray tube (CRT). Normally, the stationary type display unit is supported on a stand. To freely change the angle of the display unit in relation to the stand, the display unit is installed to the stand with a tilting hinge so that it can be tilted up and down, rotatable and horizontally oscillated to a desired position.

As a means for tilting up and down the display unit, tilting hinges have been proposed which employ a torsion spring having a torque with which the weight of the display unit can be supported and also a friction mechanism provided in addition to the torsion spring.

Many tilting hinges use only a friction mechanism for rotating the display unit but only a few use a means for oscillating the display unit horizontally.

In the well-known means for tilting up and down the display unit in relation to the stand, the moment generated when the display unit is tilted changes depicting a trigonometric function curve while the torque of the torsion spring changes linearly. Thus, the force of operation required for changing the angle of the display unit varies from one to another tilted angle of the display unit. Further, with an increased weight of the display unit and for easier operation of the tilting hinge for setting the display unit at a desired angle, the number of turns of the torsion spring should be increased, which will result in a large tilting hinge.

With the conventional means for rotating the display unit, the latter is rotated steplessly, so that the user will not feel no detent when the display unit is stopped and the weight and long-term use of the display unit will cause the friction mechanism to be abraded. As a result, the performance of the titling hinge will be lower so that the display unit cannot be stably stopped from rotating.

OBJECTS AND SUMMARY OF THE INVENTION

Therefore, the present invention has an object to overcome the above-mentioned drawbacks of the prior art by providing a tilting hinge adapted such that the force of operation required for tilting up and down a display unit will not vary from one to another tilted angle of the display unit.

The present invention has another object to provide a tilting hinge with which the user can rotate the display unit with a detent and which can be used with no performance degradation even after it has been used for a long term and permits to oscillate the display unit horizontally.

The present invention has a still another object to provide a tilting hinge which can attain the above objects in combination.

The above object can be attained by providing a tilting hinge including a stand member, a fixing member installed to the top of the stand member with a pivot pin to be frictionally pivotable horizontally, a support member installed to either side plate of the fixing member with a hinge pin to be frictionally pivotable vertically, an actuator pin installed to either side plate of the support member and penetrated through an arcuate elongated hole formed in both the side plates of the fixing member, a slider provided in contact with the actuator pin to be slidable vertically between both the side plates of the fixing member, a compression spring provided between the slider and a bottom plate of the fixing member, and a rotating plate installed to the front side of the support member with a pivot pin to be frictionally pivotable vertically and to which the display unit is to be fixed.

In the above tilting hinge according to the present invention, means for frictionally pivoting the support member vertically in relation to the fixing member is provided with the hinge pin being installed to the fixing member and the support member being installed to the hinge pin to be tiltable up and down, a first friction washer is provided between one side of the support member and a large-diameter portion of the hinge pin with the hinge pin being inserted through the center of the first friction washer, a second friction washer is provided on the other side of the support member with the hinge pin being inserted through the center of the second friction washer, and a spring washer and pressing washer are provided adjacent to the second friction washer with the hinge pin being inserted through the centers of the spring and pressing washers, the pressing washer on the hinge pin being calked.

In the above tilting hinge according to the present invention, a cam is formed at a portion of the slider at which the slider is in contact with the actuator pin.

Further in the above tilting hinge according to the present invention, a detent stopping mean s is provided to stop the rotating plate with a detent.

Moreover, in the above tilting hinge according to the present invention, the detent stopping means is an elongated guide hole formed in the rotating plate and through which a stopper pin projected from the support member and a catch plate is provided at each of the beginning and trailing ends of the elongated guide hole to catch the stopper pin.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
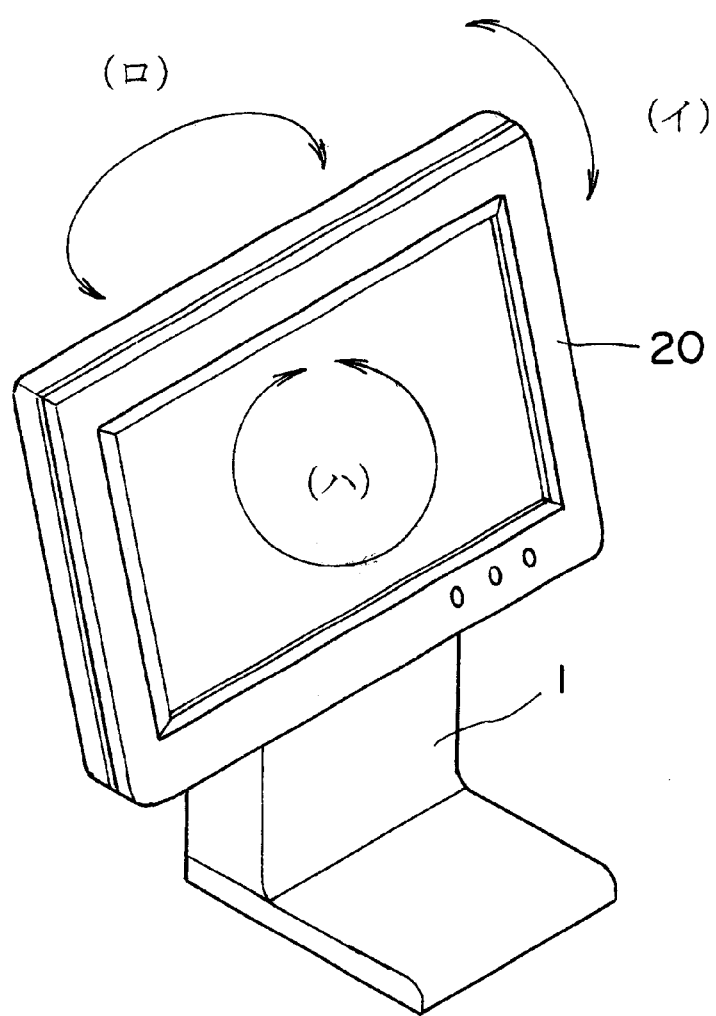
FIG. 1 is a perspective view of a personal computer display unit, television display unit and the like of a stationary type, which are to be supported with the tilting hinge according to the present invention.

Referring now to FIG. 1, there are illustrated a support stand 1 and a liquid crystal display unit (will be referred to as "LC display unit" hereinafter) 20. The LC display unit 20 is installed to the support stand by means of the tilting hinge according to the present invention.

Figure 2:
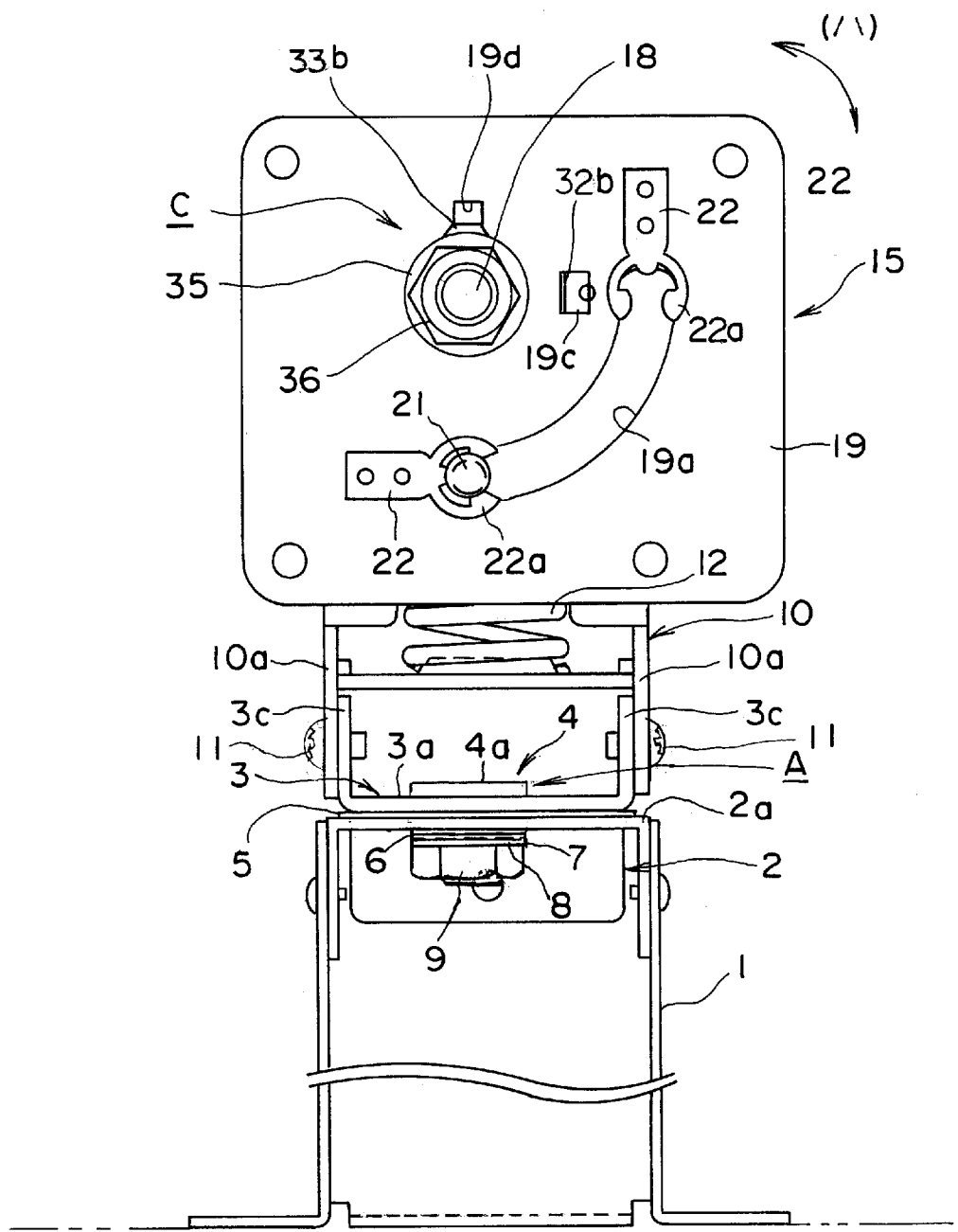
FIG. 2 is a front view of the tilting hinge according to the present invention.
Figure 3:
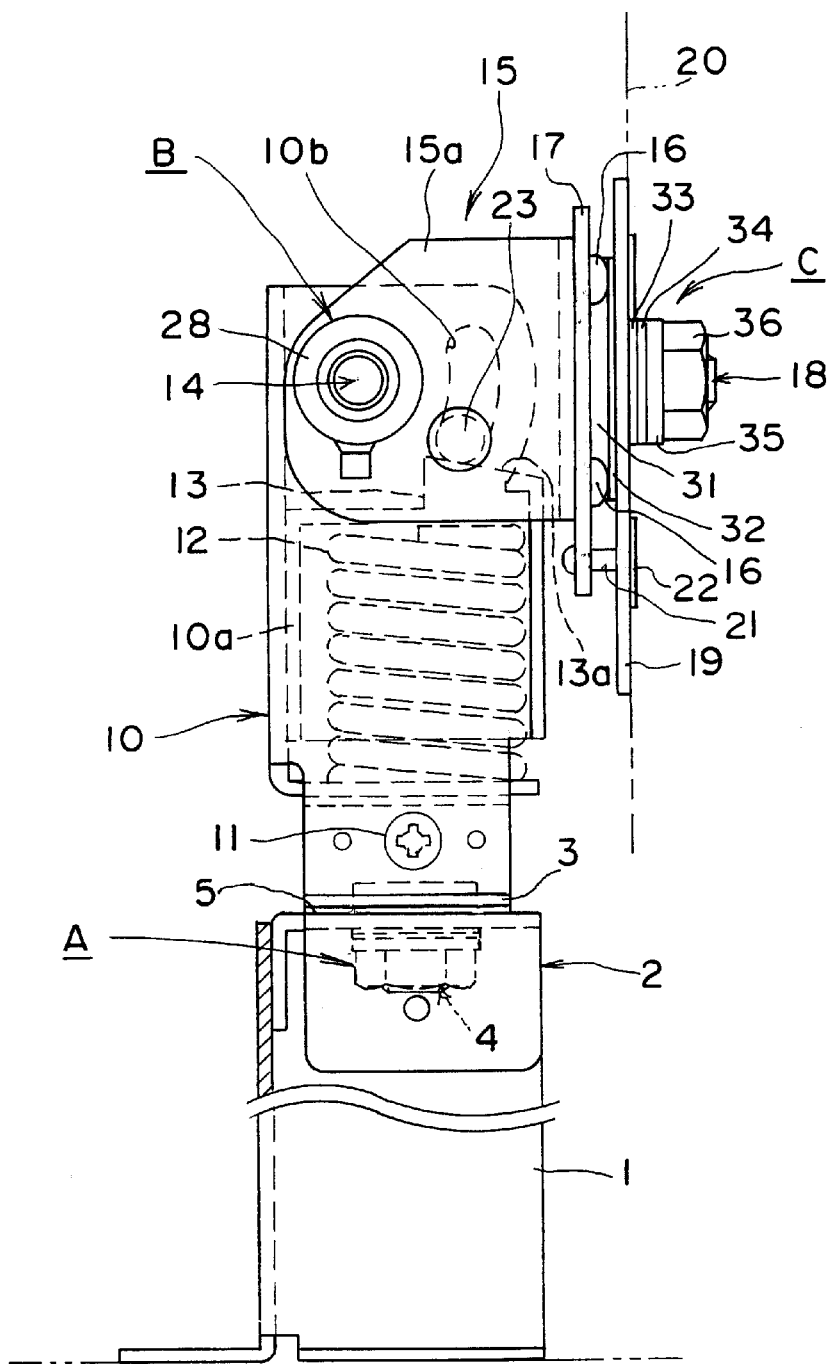
FIG. 3 is a side elevation of the tilting hinge in FIG. 2.
Figure 4:
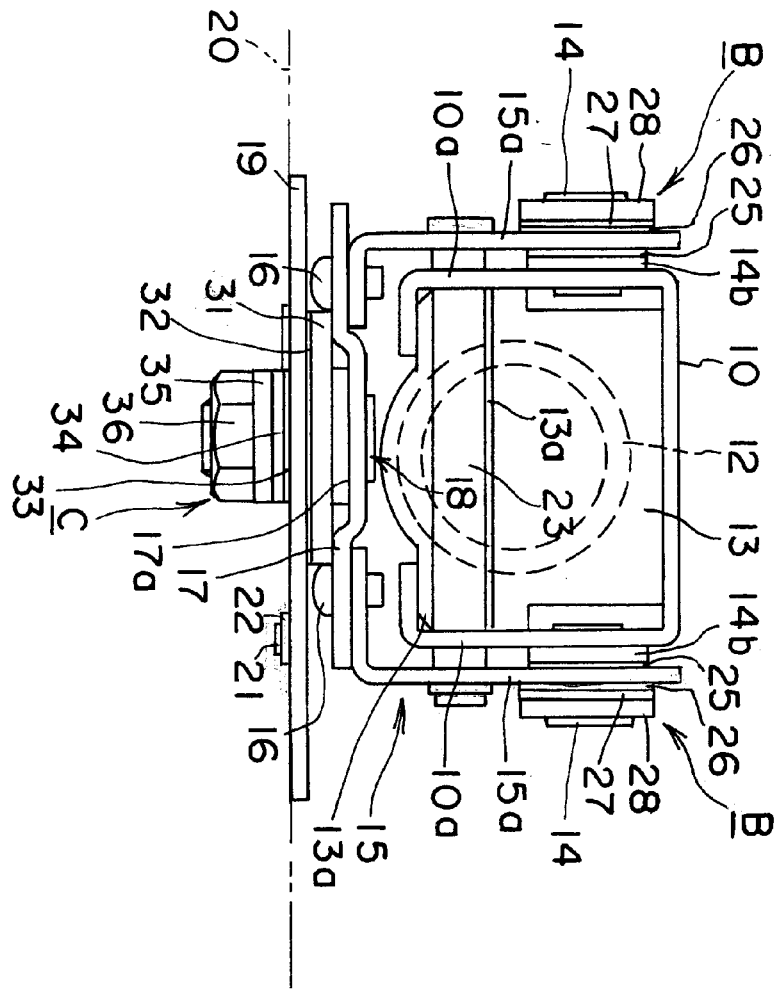
FIG. 4 is a plan view of the tilting hinge in FIG. 2.
Figure 5:
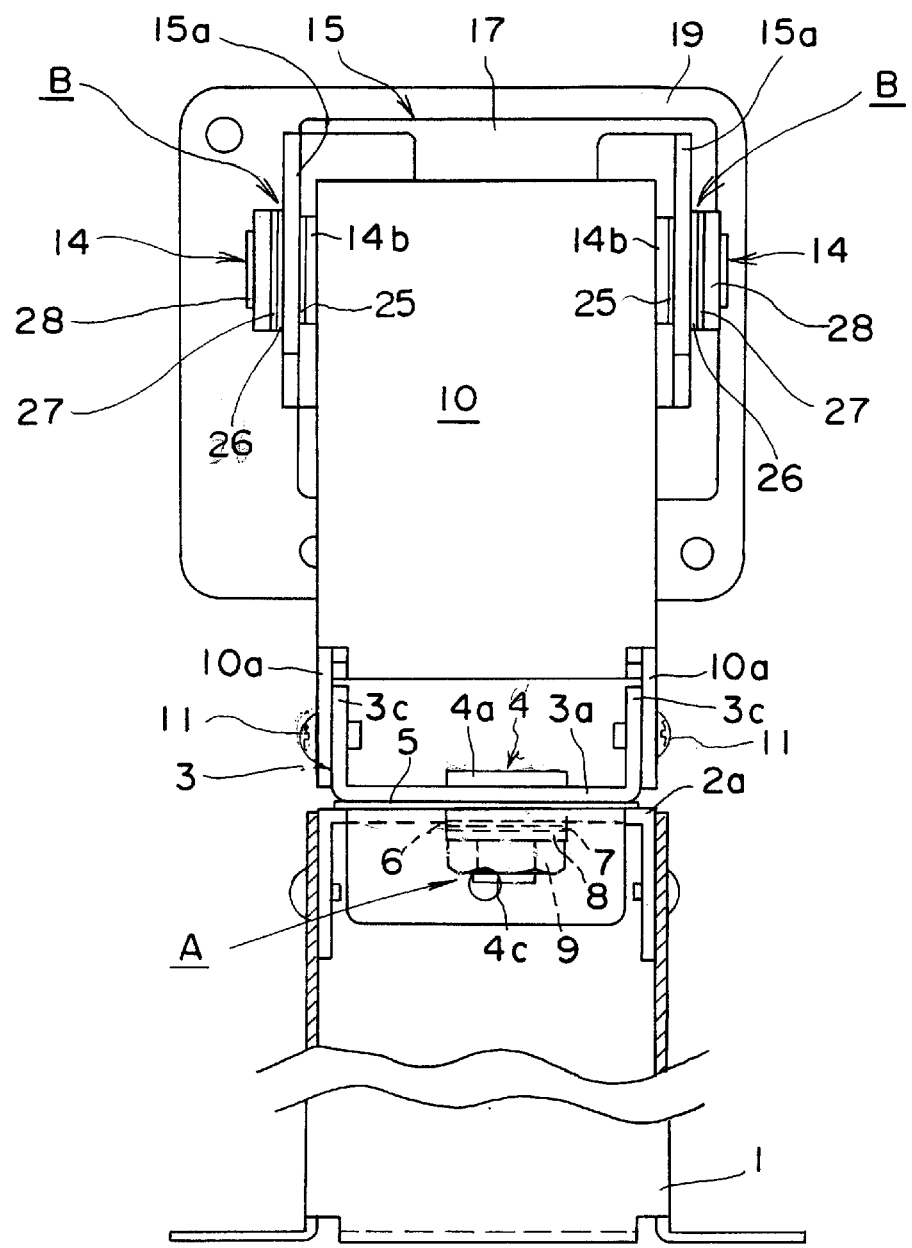
FIG. 5 is a rear view of the tilting hinge in FIG. 2.
Figure 6:
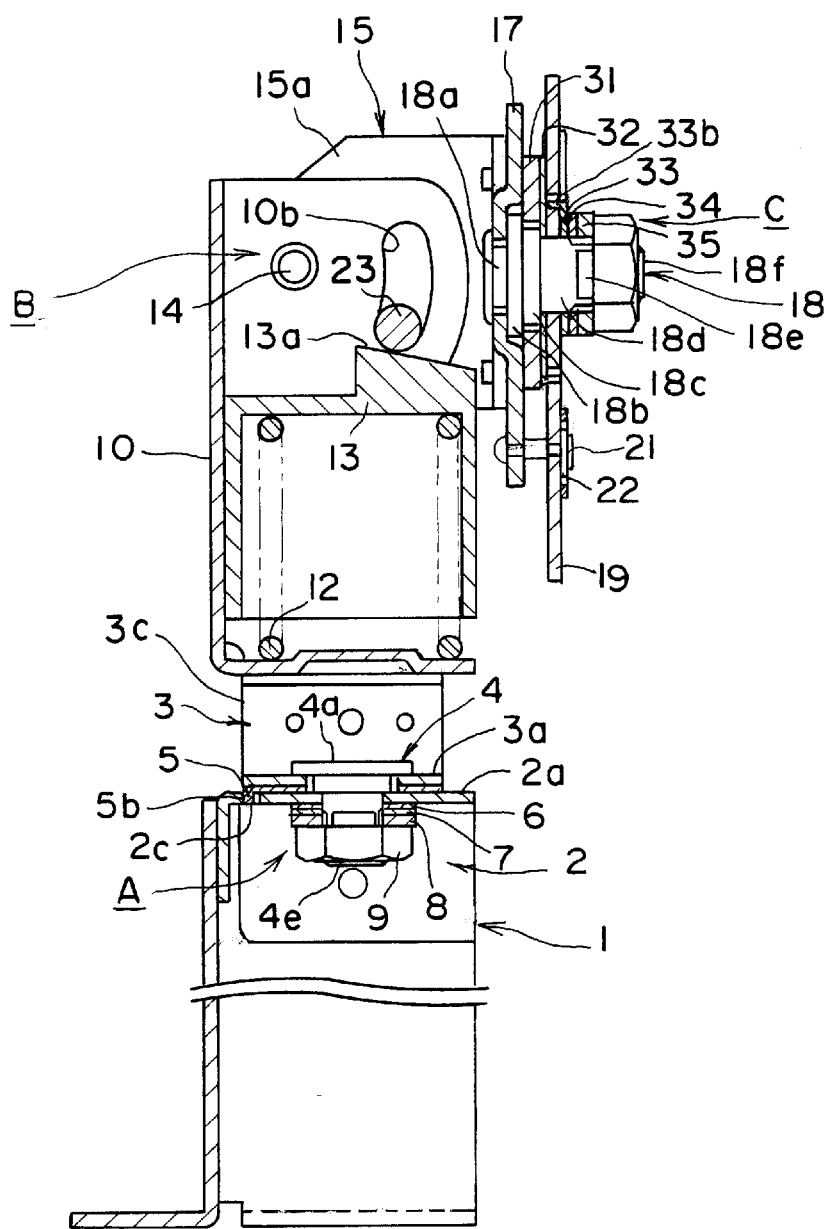
FIG. 6 is an axial sectional view of the tilting hinge in FIG. 2.
Figure 7:
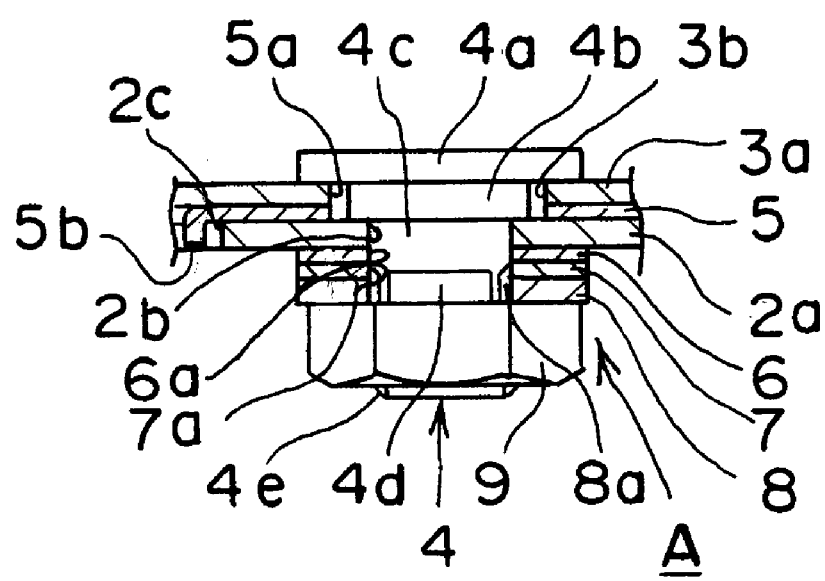
FIG. 7 shows, enlarged in scale, the first friction mechanism A in FIG. 6.
Figure 8:
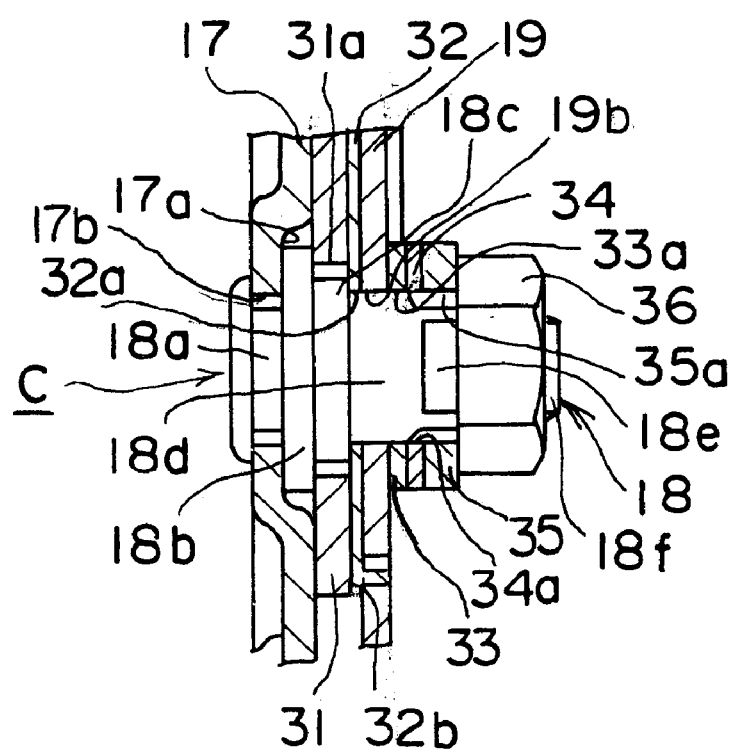
FIG. 8 shows, enlarged in scale, the third friction mechanism in FIG. 6.
Figure 9:
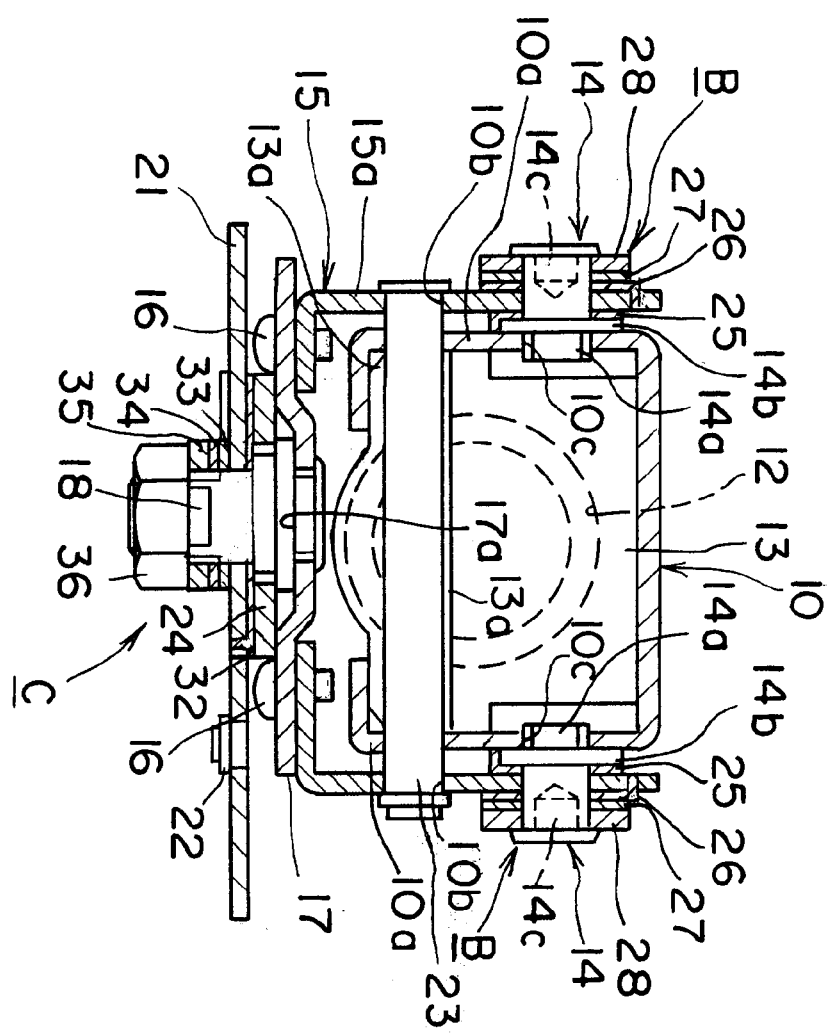
FIG. 9 is a cross-sectional view, enlarged in scale, of the second friction mechanism B of the tilting hinge according to the present invention.
Figure 10:
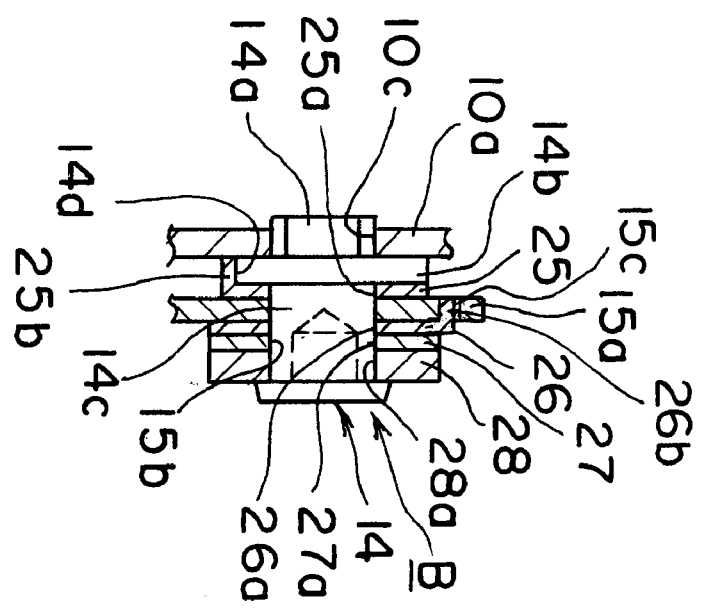
FIG. 10 shows, enlarged in scale, the second friction mechanism in FIG. 9.
Figure 11:
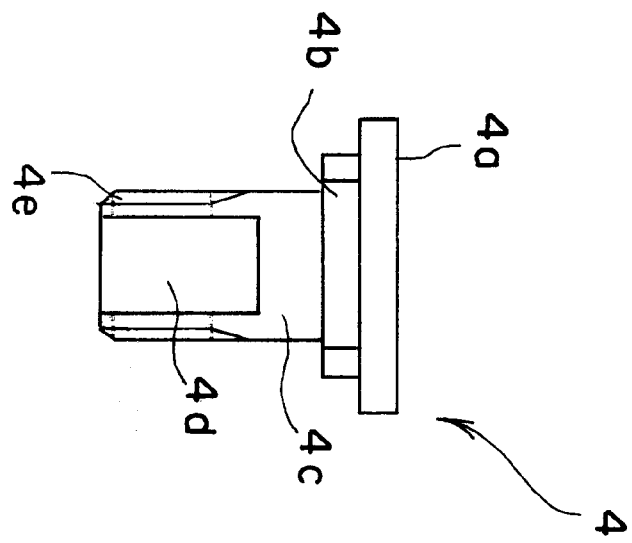
FIG. 11 is a front view of the shaft of the first friction mechanism A.
Figure 12:
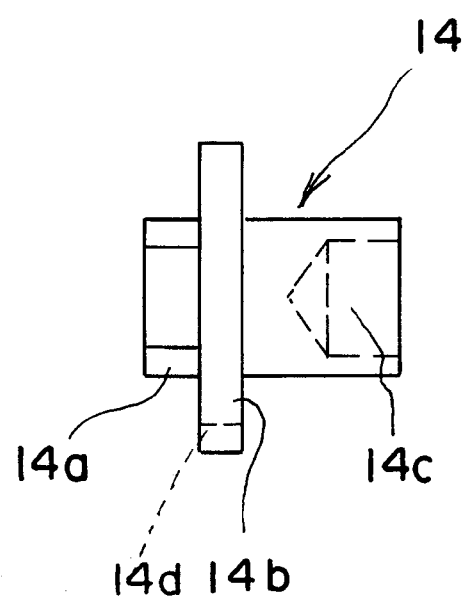
FIG. 12 is a front view of the shaft of the second friction mechanism B.
Figure 13:
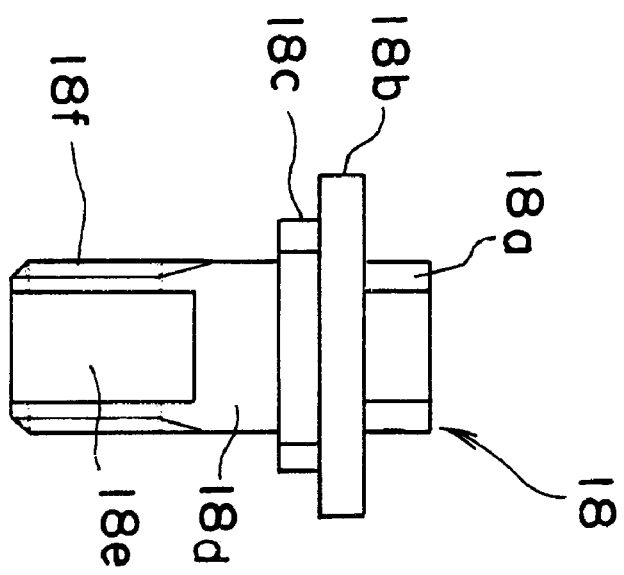
FIG. 13 is a front view of the shaft of the third friction mechanism C.
Figure 14:
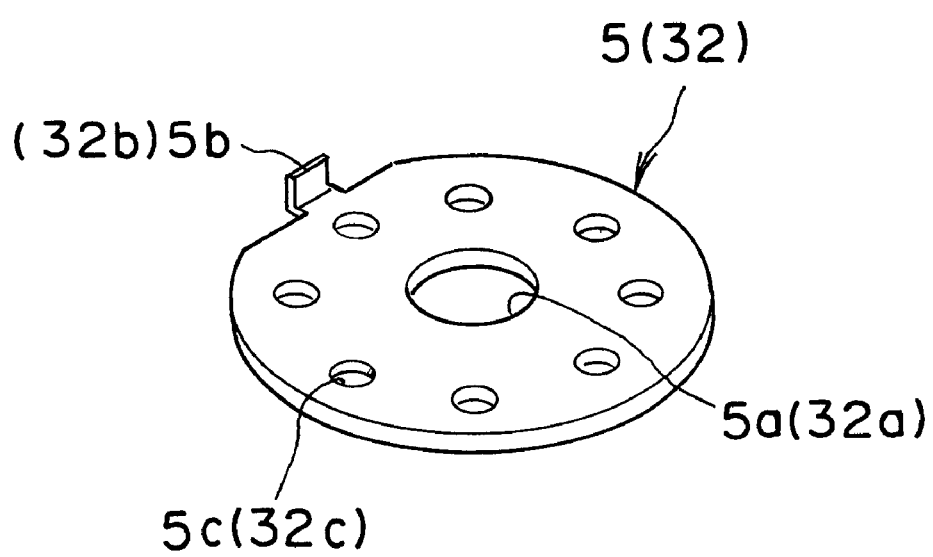
FIG. 14 is a perspective view of the first friction washer used in the first and third friction mechanisms A and C.

FIG. 2 and subsequent Figures show the construction and major components of the tilting hinge according to the present invention. As shown, the tilting hinge includes a plate 2 for fixation to the top of the stand 1. The fixing plate 2 has a top plate 2a to which a support plate 3 bent to have a generally U shape as viewed from the front is installed to be frictionally pivotable horizontally by a first friction mechanism A.

As best shown in FIGS. 6, 7, 11 and 14, the first friction mechanism A includes a rotating shaft 4, first friction washer 5, second friction washer 6, spring washer 7, pressing washer 8 and a clamping nut 9. The rotating shaft 4 consists, axially thereof, a head portion 4a, middle- diameter portion 4b having a non-circular cross section (will be referred to as "non-circular middle-diameter portion" hereinafter and the term "non-circular" will be used for a member having any shape other than a circular one), small-diameter portion 4c, non-circular small-diameter portion 4d and an externally threaded portion 4e formed on the non-circular small-diameter portion 4d. The support plate 3 consists of a base plate portion 3a having formed therein a through-hole 3b in which the non-circular middle-diameter portion 4b of the rotating shaft 4 is engaged. The fixing plate 2 has formed in the top plate 2a thereof a circular bearing hole 2b through which the small-diameter portion 4c of the rotating shaft 4 is rotatably penetrated. The first friction washer 5 is provided between the bottom of the fixing plate 2 and support plate 3 and has formed in the center thereof a through-hole 5a through which the small-diameter portion 4c of the rotating shaft 4 is penetrated. The first friction washer 5 has an engagement piece 5b projecting from the edge thereof and engaged in an engagement hole 2c formed in the fixing plate 2. The second friction washer 6 is placed under the fixing plate 2, with the top plate portion 2a of the fixing plate 2 being placed between the first friction washer 5 and second friction washer 6. The second friction washer 6 has formed in the center thereof a non-circular through-hole 6a in which the non-circular small-diameter portion 4d of the rotating shaft 6 is engaged. The spring washer 7 has a circular through-hole 7a formed in the center thereof and the pressing washer 8 has a non-circular through-hole 8a formed in the center thereof. The spring washer 7 and pressing washer 8 are provided near the bottom of the second friction washer 6 with the non-circular portion 4b of the rotating shaft 4 being inserted through the circular through-hole 7a and non-circuit through-hole 8a. The clamping nut 9 is screwed on the external thread 4e of the non-circular small-diameter portion 4d, at the pressing washer 8, of the rotating shaft 4.

Thus, the support plate 3 is frictionally rotatable horizontally only when the support plate 3 is applied with a predetermined rotation moment. Note that the frictionally rotating portion of the first friction mechanism A is applied with a lubricant. The first friction washer 5 has formed therein a plurality of oil traps 5c to receive the lubricant.

Further, the tilting hinge includes a fixing member 10 having side plate portions 10a whose lower portions are secured with screws 11 to respective side plate portions 3c the support plate 3 has at the opposite ends thereof. The fixing member 10 is also a spring case. The fixing member 10 houses a compression spring 12 and a cam slider 13 fitted on the compression spring 12.

The tilting hinge further includes a support member 15 consisting of a pair of side plates 15a, each being bent to have a generally L shape, and a support plate portion 17. The side plates 15a of the support member 15 are installed to the tops of the side plate portions 10a of the fixing member 10 with a pair of hinge pins 14 to be frictionally pivotable up and down. The support plate portion 17 has a concavity 17a formed in the center thereof and is secured to the front side of the side plates 15a with screws or rivets 16. A rotating plate 19 is installed to the support plate portion 17 to be frictionally pivotable longitudinally about a shaft 18. The LC display unit 20 is to be fixed to the rotating plate 19. As best shown in FIG. 2, the rotating plate 19 has formed therein an arcuate elongated guide hole 19a in which a stopper pin 21 projected from the support plate portion 17 is guided. A catch plate 22 having a catcher 22a in which the stopper pin 21 is removably received is fixed at each of the beginning and trailing end of the elongated guide hole 19a.

Each of the side plate portions 10a of the fixing member 10 has an arcuate elongated guide hole 10b formed therein. The tilting hinge also includes an actuator 23 formed from an actuating pin. The actuating pin of the actuator 23 is provided between the side plates 15a of the support member 15 and penetrated through the arcuate elongated guide holes 10b. The tilting hinge also includes a slider 13 having a cam 13a formed on the upper side thereof The actuating pin of the actuator 23 abuts the cam 13a of the slider 13.

Further, the tilting hinge includes second friction mechanisms B which pivot the support member 15 frictionally up and down. Since the second friction mechanisms B are identical in construction to each other, only one of them will be described below concerning its internal structure with reference to FIGS. 9, 10, 12 and 14. Each of the above hinge pins 14 consists, axially thereof, of a non-circular fixing portion 14a, large-diameter portion 14b and a small-diameter portion 14c. The support member 15 is coupled to the fixing member 10 tiltably up and down with the non-circular fixing portion 14a of the hinge pin 14 being fitted in a non-circular fixing hole 10c formed in the side plate portion 10a of the fixing member 10 while the small-diameter portion 14c of the hinge pin 14 is inserted in a through-hole 15b formed one of the side plates 15a of the support member 15. The side plate 15a is laid between a first friction washer 25 and second fiction washer 26 with the small-diameter portion 14c of the hinge pin 14 being inserted in through-hole 25a and 26a formed in the centers of the friction washers 25 and 26, respectively. At the second friction washer 26, there are further provided a spring washer 27 and plain washer 28 with the small-diameter portion 14c of the hinge pin 14 being inserted in through-holes 27a and 28a formed in the centers of the washers 27 and 28, respectively. The first friction washer 25 has an engagement piece 25b projected from the outer edge thereof and which is engaged in an engagement recess 14d formed in the large-diameter portion 14b of the hinge pin 14, and the second friction washer 26 has an engagement piece 26b projected from the outer edge thereof and which is engaged in an engagement hole 15c formed in the side plate 15a of the support member 15. By calking the plain washer 28 on the small-diameter portion 14c of the hinge pin 14, the first and second friction washers 25 and 26 are pressed to the side plate 15a of the support member 15. When the support member 15 is tilted, a friction torque will be generated in the pressed-contact portion. Note that the portions of the second friction mechanisms B which are frictionally pivoted are also applied with a lubricant.

Further, the tilting hinge includes a third friction mechanism C which frictionally pivots the rotating plate 19 in relation to the support plate portion 17 of the support member 15. The third friction mechanism C will further be described below with reference to FIGS. 6, 8, 13 and 14. The aforementioned shaft 18 consists, axially thereof, of a non-circular fixing portion 18a, large-diameter portion 18b, non-circular middle-diameter portion 18c, small-diameter portion 18d and a non-circular small-diameter portion 18e. The shaft 18 is secured to the support plate portion 17 with the non-circular fixing portion 18a being fitted in a non-circular fixing hole 17b formed in the support plate portion 17 and calked at the end thereof. The non-circular middle-diameter portion 18c of the shaft 18 is inserted and engaged in a non-circular through-hole 31a formed in the center of a fixing spacer 31, and the small-diameter portion 18d is inserted rotatably in the arcuate elongated guide hole 19a in the rotating plate 19. The rotating plate 19 has provided on the opposite sides thereof a large-diameter first friction washer 32 and small-diameter friction washer 33, respectively, with the small-diameter portion 18d of the shaft 18 being inserted in through-holes 32a and 33a formed in the centers of the friction washers 32 and 33, respectively, and engagement pieces 32b and 33b projected from the edges of the friction washers 32 and 33, respectively, being engaged in engagement holes 19c, respectively, formed in the rotating plate 19. A spring washer 34 and pressing washer 35 are further provided adjacent to the small-diameter second friction washer 33 with the small-diameter portion 18d and non-circular small-diameter portion 18e of the shaft 18 being inserted in a through-hole 34a and non-circular through-hole 35a formed in the centers of the washers 34 and 35, respectively. The non-circular small-diameter portion 18e of the shaft 18 is externally threaded at 18f. By turning to tighten a clamping screw 36 on the external thread 18f on the non-circular small-diameter portion 18e of the shaft 18, the fixing spacer 31 and spring washer 34 are pressed to one side of the first and second friction washers 32 and 33, respectively. When the rotating plate 19 is rotated, a friction torque will be generated at the born position of the rotating plate 19. Note that the portion of the third friction mechanism C which is frictionally pivoted is also applied with a lubricant and the first friction washer 32 has a plurality of oil traps 32c formed therein.

Therefore, when the LC display unit 20 is pressed up or down in the direction of arrow (a) as in FIG. 1, the pressure is conveyed to the rotating plate 19 and support member 15 which will in turn be pivoted about the hinge pins 14. Thus the LC display unit 20 is allowed to be tilted. At this time, a torque generated about the axes of the hinge pins 14 due to the weight of the LC display unit 20 is canceled by a torque generated about the axes of the hinge pins 14 by the compression spring 12 and conveyed via the slider 13 and actuator 23, so that the LC display unit 20 will be sustained against spontaneous tumble. The display unit 30 is stopped and held stably at a desired tilted position owing to the friction generated by the second friction mechanisms B. At this time, since a curve depicted by the rotation moment generated by the compression spring 12 and the cam 13a of the slider 13 can be made to approximately coincide with that depicted by the torque of the LC display unit 20, the LC display unit 20 can always be tilted with the same operating force when at any tilted position.

Further, the up- and down-tilt angle of the LC display unit 20 is limited by the actuator 23 fitted in the elongated guide holes 10b.

For turning the LC display unit 20 from a vertical position (with the long side being upright) to a horizontal position (with the long side being horizontal) or vice versa, the LC display unit 20 is to be rotated by hand in the direction of arrow (c) as in FIG. 1. In this case, the tilting hinge according to the present invention functions as will be described herebelow. Namely, as the LC display unit 20 is rotated to the vertical position, it will leave the catcher 22a of one of the catch plates 22 that is holding the stopper pin 21, the shaft 18 be frictionally pivoted about the shaft 18 by a friction generated by the third friction mechanism C, the stopper pin 21 is moved along the elongated guide hole 19a and engaged in the catcher 22a of the other catch plate 22, and thus the LC display unit 20 is stably stopped after rotated through 90 deg. Since the LC display unit 20 is controlled in rotation to the vertical position by the third friction mechanism C, it will stably be stopped and held at a desired angle which is smaller than 90 deg. At such a position, the user will feel a detent when the stopper pin 21a is engaged in the catcher 22a of the catch plate 22.

For oscillating the LC display unit 20 horizontally in the direction of arrow (b) as in FIG. 1, the LC display unit 20 is to be pressed clockwise or counterclockwise. The force applied to the LC display unit 20 will be conveyed to the rotating plate 19, support member 15, fixing,member 10 and then to the support plate 3 which will in turn be rotated along with the rotating shaft 4 and against the frictional resistance of the first friction mechanism A, thereby permitting to stably stop the LC display unit 20 at a desired oscillated position.

Furthermore, according to the present invention, the torque may be changed as desired by changing the resilience of the compression spring 12, shape of the cam 13a of the slider 13, shape of the actuator 23 and the distance between the actuator 23 and hinge pin 14.

According to another aspect of the present invention, the support plate 3 may be formed integrally with the fixing member 10, and also a resilience of the compression spring 12, shape of the cam 13a of the slider 13, shape of the actuator 23 and a distance between the actuator 23 and hinge pin 14 may freely be selected as mentioned above. Moreover, the first to third friction mechanisms A to C are not limited to the above-mentioned ones. Namely, the first to third friction mechanisms A to C may be swapped among them, and it may freely be selected as necessary how to use each of the friction washers, that is, whether it should be engaged on the rotating shaft or on any other member and on which side of each friction washer the friction torque should be generated. Furthermore, the support member 15 may be provided integrally with the side plates 15a and support member 17 although they are provided separated in the embodiment having been described above. The tilting hinge is adapted for the LC display unit 20 to be stopped with a detent at a single position or at a plurality of positions when the LC display unit 20 is at a middle angular position.

In the aforementioned embodiment, the non-circular portions of the rotating shaft 4, hinge pin 14 and shaft 18 are formed to have a generally elliptic cross section by cutting the components at both sides. However, this cross-sectional shape may be a semi-circularity, a polygon or a recessed circle. In this case, the non-circular through-holes in which the non-circular portions are to be inserted should be formed to match the shapes of the mating non-circular portions.

What is claimed is:

1. A tilting hinge for a display unit, comprising:
   a stand member having a top plate;
   a fixing member having a bottom plate, a rear plate and a pair of side plates, the fixing member being installed to the top plate of the stand member with a pivot pin which is frictionally pivotable horizontally;
   a support member having a front plate and a pair of side plates, the side plates of the support member being swingably connected vertically and frictionally by a hinge pin to the side plates of the fixing member;
   an actuator pin fixed to the side plates of the support member and penetrating through an arcuate elongated hole formed in the side plates of the fixing member;
   a slider provided in contact with the actuator pin to be slidable vertically between the side plates of the fixing member;
   a compression spring provided between the slider and the bottom plate of the fixing member; and
   a rotating plate which is installed to a front plate of the support member with a pivot pin that is frictionally pivotable vertically and to which the display unit is adapted to be fixed.

2. The tilting hinge as set forth in claim 1, including means for frictionally swinging the support member vertically in relation to the fixing member, the means for frictionally swinging including;
   a first friction washer between one side plate of the support member and a large-diameter portion of the hinge pin with the hinge pin being inserted through the center of the first friction washer;
   a second friction washer provided on the other side plate of the support,member with the hinge pin being inserted through a center of the second friction washer; and
   a spring washer and pressing washer, provided adjacent the second friction washer with the hinge pin being inserted through centers of the spring and pressing washers;
   the pressing washer on the hinge pin being calked.

3. The tilting hinge as set forth in claim 1, wherein the slider has a cam formed at a portion thereof at which the slider is in contact with the actuator pin.

4. The tilting hinge as set forth in claim 1, wherein the rotating plate has therein a detent stopping means to stop the rotating plate with a detent.

5. The tilting hinge as set forth in claim 4, wherein the detent stopping means is an elongated guide hole formed in the rotating plate and through which a stopper pin projecting from the support member and a catch plate is mounted on both ends of the elongated guide hole to catch the stopper pin.

* * * * *